(12) United States Patent
Yang

(10) Patent No.: US 8,408,019 B2
(45) Date of Patent: Apr. 2, 2013

(54) AIR CONDITIONING DEVICE UTILIZING TEMPERATURE DIFFERENTIATION OF EXHAUSTED GAS TO EVEN TEMPERATURE OF EXTERNAL HEAT EXCHANGER

(76) Inventor: Tai-Her Yang, Dzan-Hwa (TW)

( * ) Notice: Subject to any disclaimer, the term of this patent is extended or adjusted under 35 U.S.C. 154(b) by 219 days.

(21) Appl. No.: 12/961,585

(22) Filed: Dec. 7, 2010

(65) Prior Publication Data

US 2012/0137715 A1  Jun. 7, 2012

(51) Int. Cl.
*F25B 27/00* (2006.01)
(52) U.S. Cl. .................................................. 62/238.7
(58) Field of Classification Search ............... 62/324.1, 62/238.7, 238.6, 324.5, 314, 169; 165/59
See application file for complete search history.

(56) References Cited

U.S. PATENT DOCUMENTS

| | | | | |
|---|---|---|---|---|
| 4,802,339 A | * | 2/1989 | Gregory | 62/196.4 |
| 2001/0037652 A1 | * | 11/2001 | Sasayama et al. | 62/201 |
| 2006/0053820 A1 | * | 3/2006 | Taras et al. | 62/324.1 |
| 2008/0223064 A1 | * | 9/2008 | Feuerecker et al. | 62/324.2 |

* cited by examiner

*Primary Examiner* — Melvin Jones
(74) *Attorney, Agent, or Firm* — Bacon & Thomas, PLLC

(57) ABSTRACT

This invention relates to an air conditioning device which regulates the temperature of an airflow exhausted from the space in a cooling/heating air conditioning object (such as inside of a room or vehicle) to the external through an external heat exchanger disposed externally for heat exchanging so as to allow the exhausted airflow to even the temperature of the fluid flowing through the heat exchanger by means of the temperature differentiation of the two fluids, thereby enhancing the efficiency of the air conditioning device while reducing the energy consumption of the air conditioning device.

15 Claims, 7 Drawing Sheets

AIR CONDITIONING DEVICE UTILIZING TEMPERATURE DIFFERENTIATION OF EXHAUSTED GAS TO EVEN TEMPERATURE OF EXTERNAL HEAT EXCHANGER

BACKGROUND OF THE INVENTION (a) Field of the Invention

This invention relates to a cooling/heating air conditioning device for regulating temperature, which pumps an airflow exhausted from a space in an air conditioning object such as inside of a room or vehicle to the external through the external heat exchanger disposed at the external of the air conditioning object such as outside of the room or vehicle so as to equalize the temperature of the fluid flowing through the internal of the external heat exchanger by means of the temperature difference between the internal and external of the air conditioning object.

(b) Description of the Prior Art

Conventionally, during the use of a cooling/heating air conditioning device, due to the need for external ventilation, vent holes are typically disposed in a window type air conditioning device to perform the external ventilation, alternatively, a window type main unit is cooperated with a ventilating device such as a ventilator or total heat exchanging ventilating device to perform the external ventilation. However, the pity is that, heretofore, when the aforementioned window type air conditioning device or split type air conditioning device is operated as a cooler, the airflow of a relatively lower temperature exhausted from the space of an air conditioning object such as inside of a room has not been used to facilitate the decreasing of the temperature of an external heat exchanger which is disposed outdoors as a condenser, and when the air conditioning device is operated as a heater, the exhausted airflow of a relatively higher temperature has not been used to facilitate the increasing of the temperature of the external heat exchanger which is disposed outdoors as an evaporator.

SUMMARY OF THE INVENTION

This invention relates to a cooling/heating air conditioning device for regulating temperature, which pumps an airflow exhausted from a space in an air conditioning object such as inside of a room or vehicle to the external through the external heat exchanger disposed at the external of the air conditioning object such as outside of the room or vehicle so as to equalize the temperature of the fluid flowing through the internal of the external heat exchanger device by means of the temperature differentiation between the two fluids. When the air conditioning device is operated as a cooler, the airflow of a relatively lower temperature exhausted from the space of the air conditioning object such as the inside of the room can be used to facilitate the decreasing of the temperature of the external heat exchanger which is disposed outdoors as a condenser, and when the air conditioning device is operated as a heater, the exhausted airflow of a relatively higher temperature can be used to facilitate the increasing of the temperature of the external heat exchanger which is disposed outdoors as an evaporator.

DESCRIPTION OF MAIN COMPONENT SYMBOLS

Figure 1:
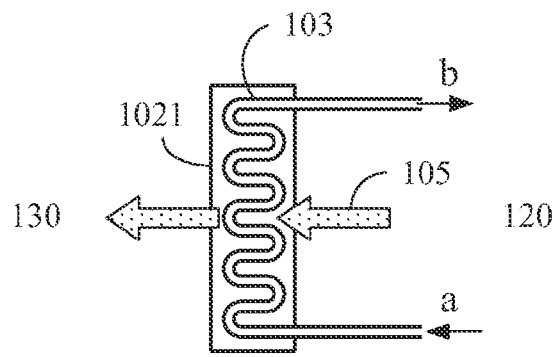
FIG. 1 is a diagram illustrating the operating principles of this invention.

101: air conditioning device main unit
103: coolant fluid pipeline
104: external heat exchanger airflow exhausting fan unit
105: air conditioning object space exhausted fluid
106: fluid exhausting path
107: water pipe
108: cooling tower fan unit
109: water in and out pipe
110: thermal insulation device
111: water pump
120: air conditioning object space
130: external temperature differentiation space
1000: air conditioning device assembly
1021: external heat exchanger
1041: blowing pump
1051: external airflow
1060: separately mounted fluid exhausting path
1061: exhaust amount regulating device
1070: external airflow intake pipe
1080: air intake and exhaust heat exchanger
2001: split type air conditioning device main unit
2002: split type air conditioning device outdoor unit
2003: powered fan provided cooling tower
2004: natural draft cooling tower
2005: water-cooled air conditioning device main unit

DETAILED DESCRIPTION OF THE PREFERRED EMBODIMENTS

Conventionally, during the use of a cooling/heating air conditioning device, due to the need for external ventilation, vent holes are typically disposed in a window type air conditioning device to perform the external ventilation, alternatively, a window type main unit is cooperated with a ventilating device such as a ventilator or total heat exchanging ventilating device to perform the external ventilation. However, the pity is that, heretofore, when the aforementioned window type air conditioning device or split type air conditioning device is operated as a cooler, the airflow of a relatively lower temperature exhausted from the space of an air conditioning object such as inside of a room has not been used to facilitate the decreasing of the temperature of an external heat exchanger which is disposed outdoors as a condenser, and when the air conditioning device is operated as a heater, the exhausted airflow of a relatively higher temperature has not been used to facilitate the increasing of the temperature of the external heat exchanger which is disposed outdoors as an evaporator.

This invention relates to a cooling/heating air conditioning device for regulating temperature, which pumps an airflow exhausted from a space in an air conditioning object such as inside of a room or vehicle to the external through the external heat exchanger disposed at the external of the air conditioning object such as outside of the room or vehicle so as to equalize the temperature of the fluid flowing through the internal of the external heat exchanger device by means of the temperature differentiation between the two fluids. When the air conditioning device is operated as a cooler, the airflow of a relatively lower temperature exhausted from the space of the air conditioning object such as the inside of the room can be used to facilitate the decreasing of the temperature of the external heat exchanger which is disposed outdoors as a condenser, and when the air conditioning device is operated as a heater, the exhausted airflow of a relatively higher temperature can be used to facilitate the increasing of the temperature of the external heat exchanger which is disposed outdoors as an evaporator.

FIG. 1 is a diagram illustrating the operating principles of this invention.

As illustrated in FIG. 1, the operating principles thereof are as follows:

FIG. 1 illustrates an example of an air cooler in which an external heat exchanger (1021) having a coolant fluid pipe (103) is operated, the function of which is to allow a high pressure gas coolant at the inlet "a" of the external heat exchanger (1021) to convert into a liquid by releasing heat to the external heat exchanger (1021) and flow out from the outlet "b" of the external heat exchanger (1021), at this time, if the temperature of an external temperature differentiation space (130) where the external heat exchanger (1021) is located is too high, it is difficult to release heat from the coolant in the coolant fluid pipe (103), thereby by utilizing an airflow exhausted externally from an indoor air conditioning object space (120) at a relatively lower temperature being blown through the external heat exchanger (1021), the temperature of the external heat exchanger (1021) is reduced to facilitate the enhancing of the cooling air conditioning efficiency; on the contrary, if an air heater is applied, by make use of an airflow exhausted externally at a relatively higher temperature being flowed through the external heat exchanger (1021), the temperature of the external heat exchanger (1021) is raised to facilitate the enhancing of the heating air conditioning efficiency.

Figure 2:
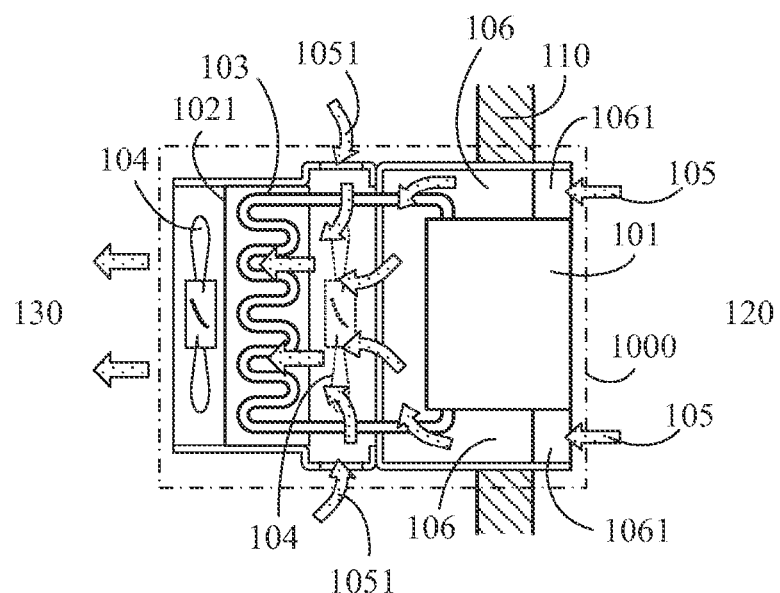
FIG. 2 is a structural schematic view of an embodiment of present invention having an integral air conditioning device with an external heat exchanger airflow exhausting fan unit (104) and a fluid exhausting path (106) so as to pump an air conditioning object space exhausted fluid (105) and an external airflow (1051) to flow together through an external heat exchanger (1021).

The air conditioning device utilizing temperature differentiation of exhausted gas to even temperature of external heat exchanger of the present invention is formed by applying the aforementioned operating principles to various types of air conditioning devices including integral air conditioning devices, split type air conditioning devices, cooling tower type air conditioning device. Several embodiments of the air conditioning device utilizing temperature differentiation of exhausted gas to even temperature of external heat exchangers of the present invention are described as follows:

FIG. 2 is a structural schematic view of an embodiment of present invention having an integral air conditioning device with an external heat exchanger airflow exhausting fan unit (104) and a fluid exhausting path (106) so as to pump an air conditioning object space exhausted fluid (105) and an external airflow (1051) to flow together through an external heat exchanger (1021).

As illustrated in FIG. 2, the main configurations are as follows:

an air conditioning device main unit (101), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having an exhaust amount regulating device (1061), and a fluid exhausting path (106) formed by a housing for allowing the airflow of the air conditioning object space (120) to flow to the external heat exchanger (1021);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the fluid exhausting path (106), enabling two airflows to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (106), which is a fluid passage structure for permitting the exhaust of the air conditioning object space exhausted fluid (105);

whereby an integral air conditioning device assembly (1000) is formed by the abovementioned structures;

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021);

In the air conditioning device utilizing temperature differentiation of exhausted gas to even temperature of external heat exchanger of the present invention, the external temperature differentiation space (130) is an external space insulated from the air conditioning object space (120) by the thermal insulation device (110);

In the air conditioning device utilizing temperature differentiation of exhausted gas to even temperature of external heat exchanger of the present invention, the external airflow (1051) is an airflow surrounding the external temperature differentiation space (130).

Figure 3:
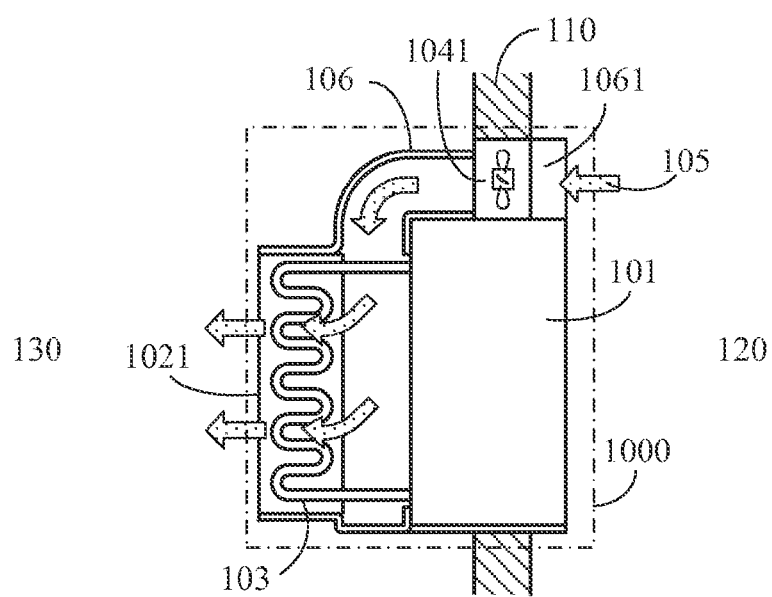
FIG. 3 is a structural schematic view of an embodiment of present invention having an integral air conditioning device without a heat exchanger airflow exhausting fan unit (104) and a ventilating device (1041) commonly constructed with a fluid exhausting path (106) so as to pump an air conditioning object space exhausted fluid (105) to flow through an external heat exchanger (1021).

FIG. 3 is a structural schematic view of an embodiment of present invention having an integral air conditioning device without a heat exchanger airflow exhausting fan unit (104) and a ventilating device (1041) commonly constructed with a fluid exhausting path (106) so as to pump an air conditioning object space exhausted fluid (105) to flow through an external heat exchanger (1021).

As illustrated in FIG. 3, the main configurations are as follows:

an air conditioning device main unit (101), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (106) formed by a housing, and having an exhaust amount regulating device (1061), the coolant fluid pipeline (103) for allowing the airflow of the air conditioning object space (120) to flow to the external heat exchanger (1021);

the external heat exchanger (1021), provided with the coolant fluid pipeline (103) for allowing the coolant passed from the main unit to heat exchange with the air conditioning object space exhausted fluid (105) through the external heat exchanger (1021);

the coolant fluid pipeline (103), which is a circulation pipeline device for coupling the air conditioning device main unit (101) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the fluid exhausting path (106), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (106), which is a fluid passage structure for permitting the exhaust of the air conditioning object space exhausted fluid (105);

whereby an integral air conditioning device assembly (1000) is formed by the abovementioned structures;

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021);

In the air conditioning device utilizing temperature differentiation of exhausted gas to even temperature of external heat exchanger of the present invention, the external temperature differentiation space (130) is an external space insulated from the air conditioning object space (120) by the thermal insulation device (110).

Figure 4:
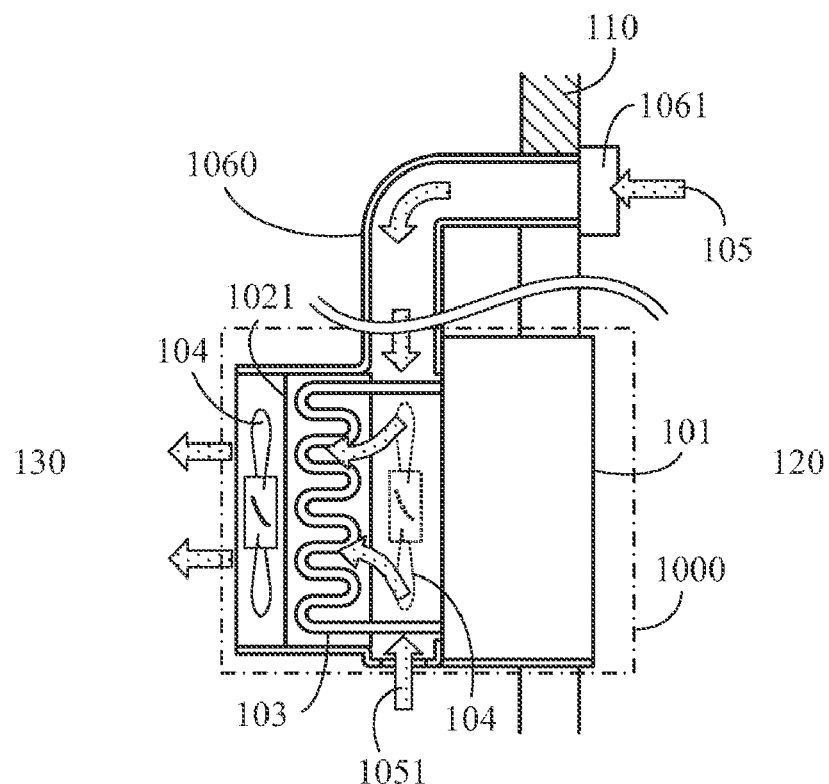
FIG. 4 is a structural schematic view of an embodiment of present invention having a separately mounted fluid exhausting path (1060) and an external heat exchanger airflow exhausting fan unit (104) so as to pump an air conditioning object space exhausted fluid (105) and an external airflow (1051) to flow together through an external heat exchanger (1021) in the air conditioning device assembly (1000).

FIG. 4 is a structural schematic view of an embodiment of present invention having a separately mounted fluid exhausting path (1060) and an external heat exchanger airflow exhausting fan unit (104) so as to pump an air conditioning object space exhausted fluid (105) and an external airflow (1051) to flow together through an external heat exchanger (1021) in the air conditioning device assembly (1000).

As illustrated in FIG. 4, the main configurations are as follows:

an air conditioning device main unit (101), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a separately mounted fluid exhausting path (1060) and an exhaust amount regulating device (1061), for serving as a path for the airflow of the air conditioning object space (120) flowing to the external heat exchanger (1021);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the separately mounted fluid exhausting path (1060), enabling two airflows to exhaust to the external temperature differentiation space (130) through the external heat exchanger (1021);

whereby an air conditioning device assembly (1000) is formed by the abovementioned structures;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021);

In the air conditioning device utilizing temperature differentiation of exhausted gas to even temperature of external heat exchanger of the present invention, the external temperature differentiation space (130) is an external space insulated from the air conditioning object space (120) by the thermal insulation device (110);

In the air conditioning device utilizing temperature differentiation of exhausted gas to even temperature of external heat exchanger of the present invention, the external airflow (1051) is an airflow surrounding the external temperature differentiation space (130).

Figure 5:
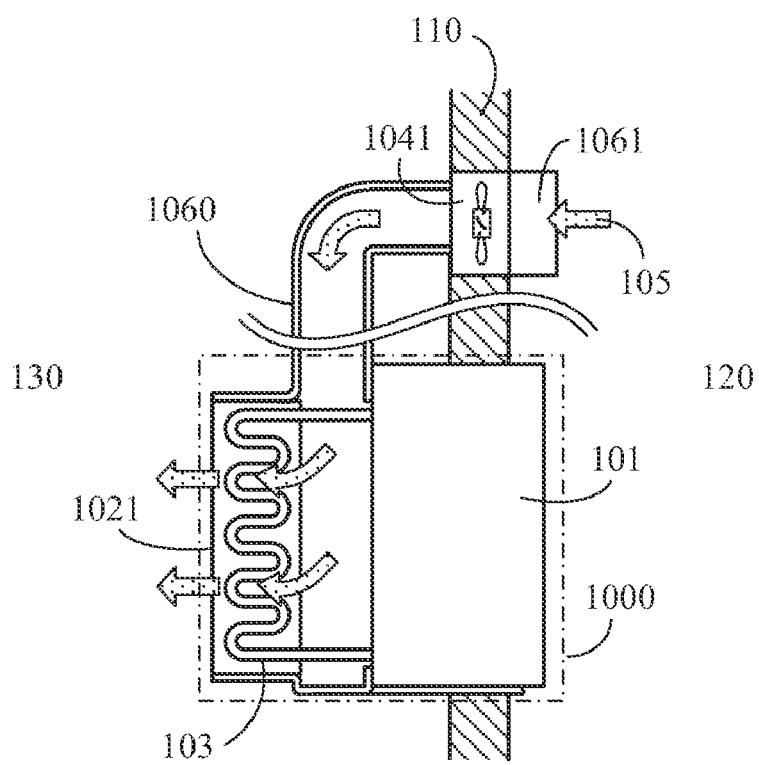
FIG. 5 is a structural schematic view of an embodiment of present invention having a separately mounted blowing pump (1041) and an exhaust amount regulating device (1061) and having an air conditioning device assembly (1000) without the external heat exchanger airflow exhausting fan unit (104).

FIG. 5 is a structural schematic view of an embodiment of present invention having a separately mounted blowing pump (1041) and an exhaust amount regulating device (1061) and having an air conditioning device assembly (1000) without the external heat exchanger airflow exhausting fan unit (104).

As illustrated in FIG. 5, the main configurations are as follows:

an air conditioning device main unit (101), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a separately mounted fluid exhausting path (1060), an exhaust amount regulating device (1061), a blowing pump (1041), for allowing the airflow of the air conditioning object space (120) to flow to the external heat exchanger (1021);

the external heat exchanger (1021), provided with the coolant fluid pipeline (103) for allowing the coolant passed from the main unit to heat exchange with the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

whereby an air conditioning device assembly (1000) is formed by the abovementioned structures;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the separately mounted fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021);

In the air conditioning device utilizing temperature differentiation of exhausted gas to even temperature of external heat exchanger of the present invention, the external temperature differentiation space (130) is an external space insulated from the air conditioning object space (120) by the thermal insulation device (110).

Figure 6:
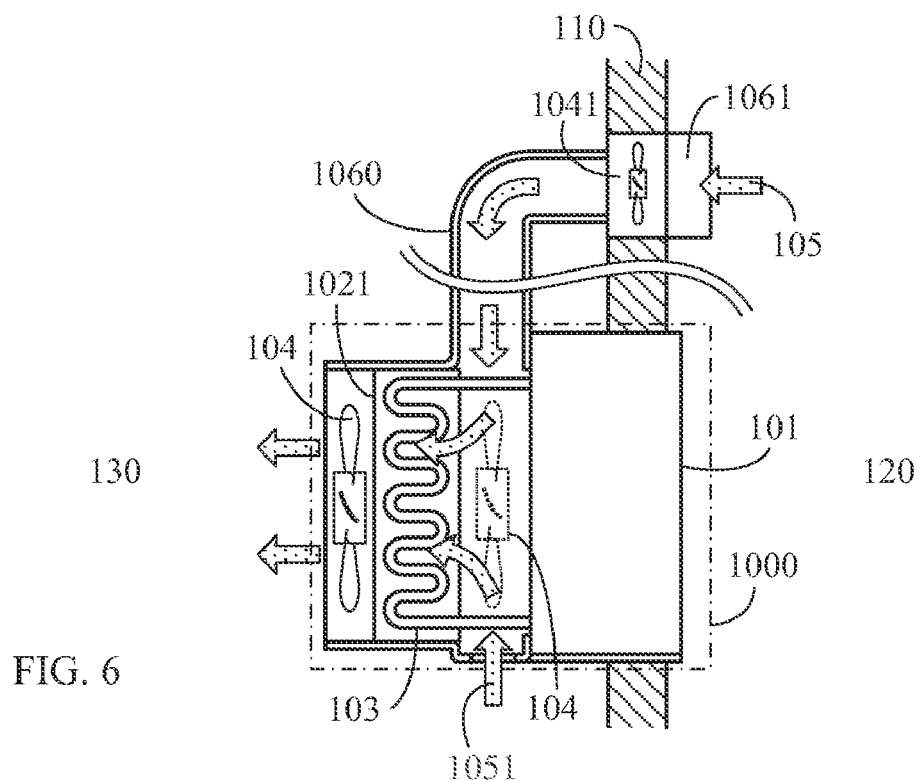
FIG. 6 is a structural schematic view of an embodiment of present invention having an integral air conditioning device assembly (1000) mounted with an external heat exchanger airflow exhausting fan unit (104) and the separately mounted fluid exhausting path (1060) and the blowing pump (1041).

FIG. 6 is a structural schematic view of an embodiment of present invention having an air conditioning device assembly (1000) mounted with an external heat exchanger airflow exhausting fan unit (104) and the separately mounted fluid exhausting path (1060) and the blowing pump (1041).

As illustrated in FIG. 6, the main configurations are as follows:

an air conditioning device main unit (101), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a separately mounted fluid exhausting path (1060) and a blowing pump (1041), for pumping the airflow of the air conditioning object space (120) to the external heat exchanger (1021);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the separately mounted fluid exhausting path (1060) by the blowing pump (1041), enabling two airflows to exhaust to the external temperature differentiation space (130) through the external heat exchanger (1021);

whereby an air conditioning device assembly (1000) is formed by the abovementioned structures;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the separately mounted fluid exhausting path (1060), so as to exhaust to the external temperature differentiation space (130) through the external heat exchanger (1021), enabling two airflows to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021);

In the air conditioning device utilizing temperature differentiation of exhausted gas to even temperature of external heat exchanger of the present invention, the external temperature differentiation space (130) is an external space insulated from the air conditioning object space (120) by the thermal insulation device (110);

In the air conditioning device utilizing temperature differentiation of exhausted gas to even temperature of external heat exchanger of the present invention, the external airflow (1051) is an airflow surrounding the external temperature differentiation space (130).

Figure 7:
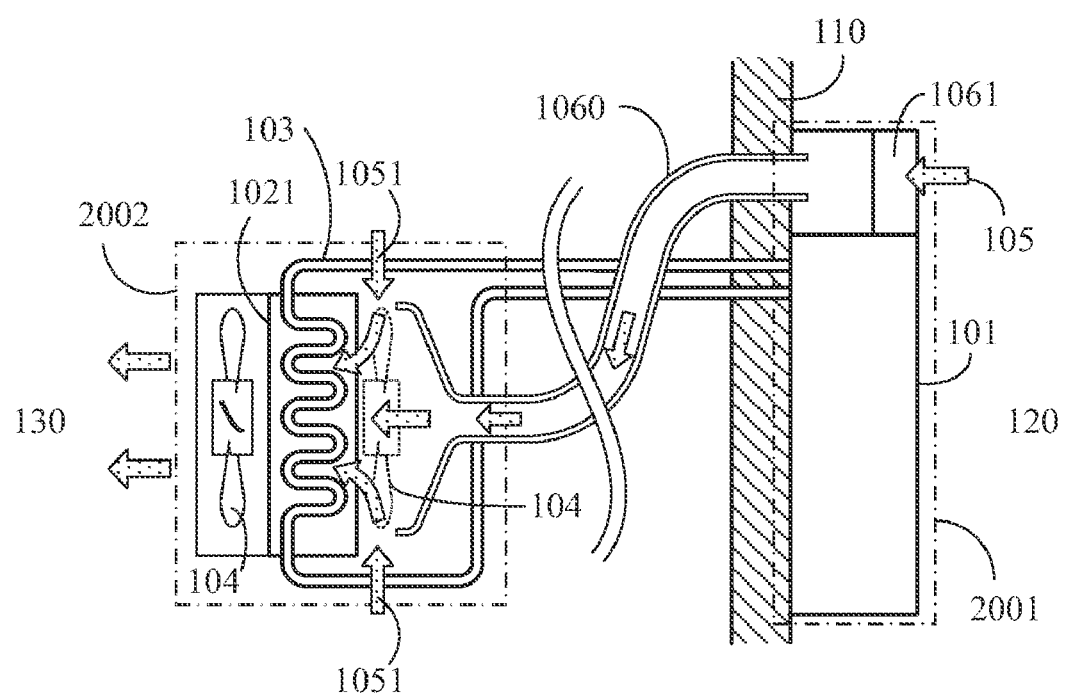
FIG. 7 is a structural schematic view of an embodiment of present invention having a split type air conditioning device outdoor unit (2002) with an external heat exchanger airflow exhausting fan unit (104) and a split type air conditioning device main unit (2001) mounted with the separately mounted fluid exhausting path (1060).

FIG. 7 is a structural schematic view of an embodiment of present invention having a split type air conditioning device outdoor unit (2002) with an external heat exchanger airflow exhausting fan unit (104) and a split type air conditioning device main unit (2001) mounted with the separately mounted fluid exhausting path (1060).

As illustrated in FIG. 7, the main configurations are as follows:

a split type air conditioning device main unit (2001), essentially consisted of a throttle device, a evaporation device, a compression device, pipelines, a control device, an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a separately mounted fluid exhausting path (1060) and an exhaust amount regulating device (1061) for serving as a path for the airflow of the air conditioning object space (120) flowing to the external heat exchanger (1021);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the separately mounted fluid exhausting path (1060), and enabling two airflows to exhaust to the external temperature differentiation space (130) through the external heat exchanger (1021);

the coolant fluid pipeline (103), which is a circulation pipeline device for coupling the air conditioning device main unit (101) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

In the air conditioning device utilizing temperature differentiation of exhausted gas to even temperature of external heat exchanger of the present invention, the external temperature differentiation space (130) is an external space insulated from the air conditioning object space (120) by the thermal insulation device (110);

In the air conditioning device utilizing temperature differentiation of exhausted gas to even temperature of external heat exchanger of the present invention, the external airflow (1051) is an airflow surrounding the external temperature differentiation space (130).

Figure 8:
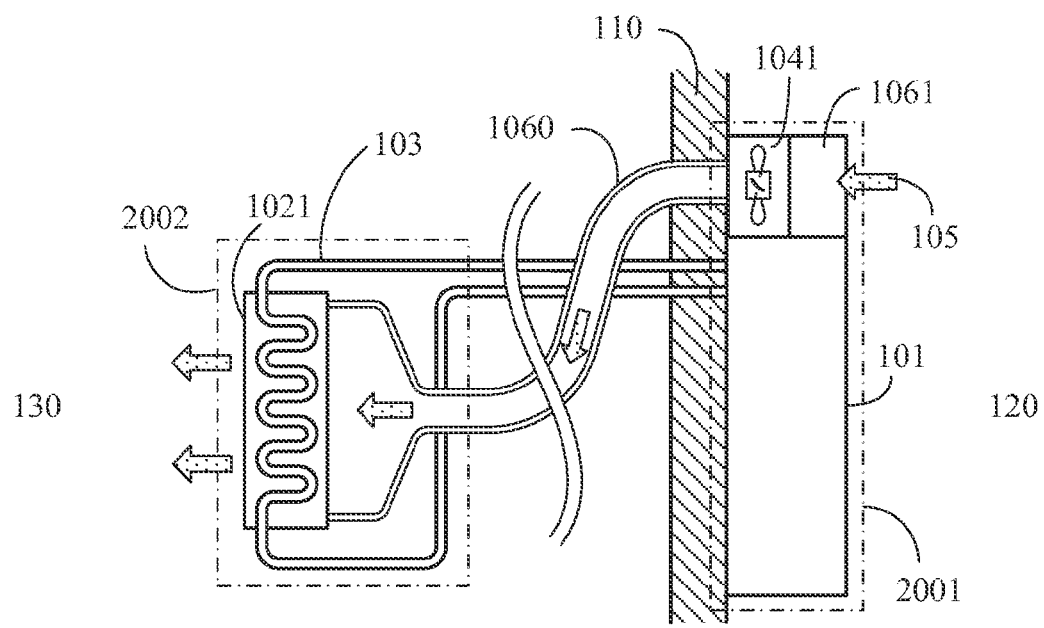
FIG. 8 is a structural schematic view of an embodiment of present invention having the split type air conditioning device main unit (2001) commonly constructed with the blowing pump (1041) and having a split type air conditioning device outdoor unit (2002) without the external heat exchanger airflow exhausting fan unit (104).

FIG. 8 is a structural schematic view of an embodiment of present invention having the split type air conditioning device main unit (2001) commonly constructed with the blowing pump (1041) and having a split type air conditioning device outdoor unit (2002) without the external heat exchanger airflow exhausting fan unit (104).

As illustrated in FIG. 8, the main configurations are as follows:

a split type air conditioning device main unit (2001), essentially consisted of a throttle device, a evaporation device, a compression device, pipelines, a control device, an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a separately mounted fluid exhausting path (1060), an exhaust amount regulating device (1061) and a blowing pump (1041), for pumping the airflow of the air conditioning object space (120) to the external heat exchanger (1021);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the air conditioning object space exhausted fluid (105) by means of the external heat exchanger (1021);

the coolant fluid pipeline (103), which is a circulation pipeline device for coupling the air conditioning device main unit (101) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation which is pumped from the air conditioning object space (120) through the exhaust amount regulating device (1061) and the separately mounted fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

In the air conditioning device utilizing temperature differentiation of exhausted gas to even temperature of external heat exchanger of the present invention, the external temperature differentiation space (130) is an external space insulated from the air conditioning object space (120) by the thermal insulation device (110).

Figure 9:
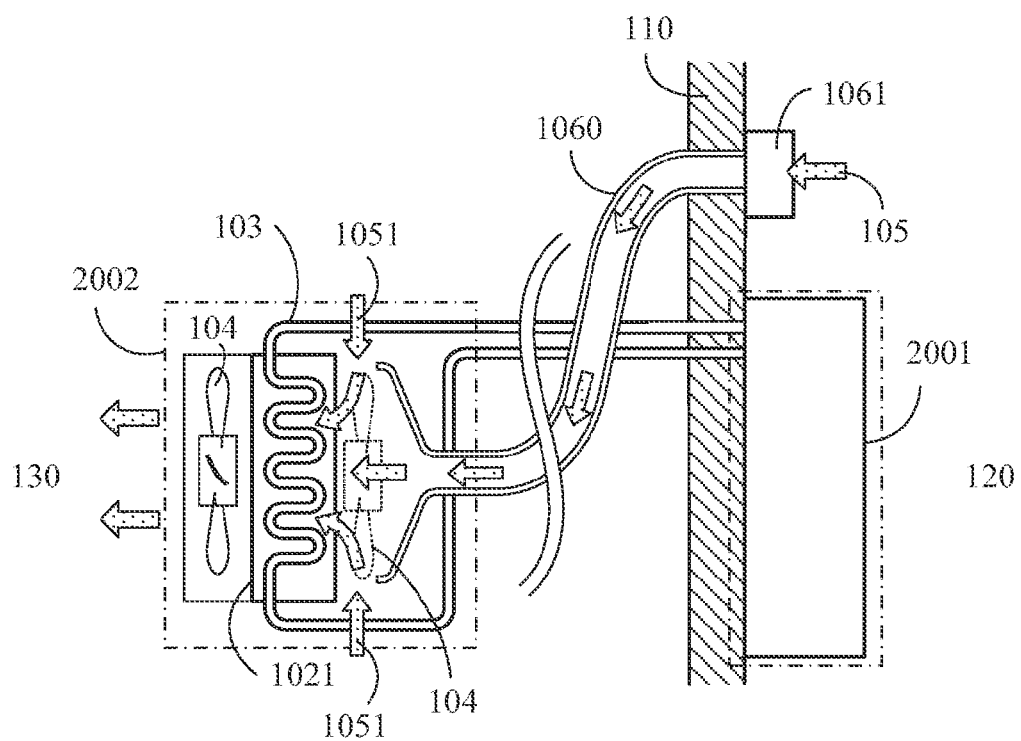
FIG. 9 is a structural schematic view of an embodiment of present invention having the separately mounted fluid exhausting path (1060), the split type air conditioning device main unit (2001) and the split type air conditioning device outdoor unit (2002) with the external heat exchanger airflow exhausting fan unit (104).

FIG. 9 is a structural schematic view of an embodiment of present invention having the separately mounted fluid exhausting path (1060), the split type air conditioning device main unit (2001) and the split type air conditioning device outdoor unit (2002) with the external heat exchanger airflow exhausting fan unit (104).

As illustrated in FIG. 9, the main configurations are as follows:

a split type air conditioning device main unit (2001), essentially consisted of a throttle device, a evaporation device, a compression device, pipelines, a control device, an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a separately mounted fluid exhausting path (1060) for serving as a path for the airflow of the air conditioning object space (120) flowing to the external heat exchanger (1021);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the separately mounted fluid exhausting path (1060), enabling two airflows to exhaust to the external temperature differentiation space (130) through the external heat exchanger (1021);

the coolant fluid pipeline (103), which is a circulation pipeline device for coupling the split type air conditioning device main unit (2001) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

In the air conditioning device utilizing temperature differentiation of exhausted gas to even temperature of external heat exchanger of the present invention, the external temperature differentiation space (130) is an external space insulated from the air conditioning object space (120) by the thermal insulation device (110);

In the air conditioning device utilizing temperature differentiation of exhausted gas to even temperature of external heat exchanger of the present invention, the external airflow (1051) is an airflow surrounding the external temperature differentiation space (130).

Figure 10:
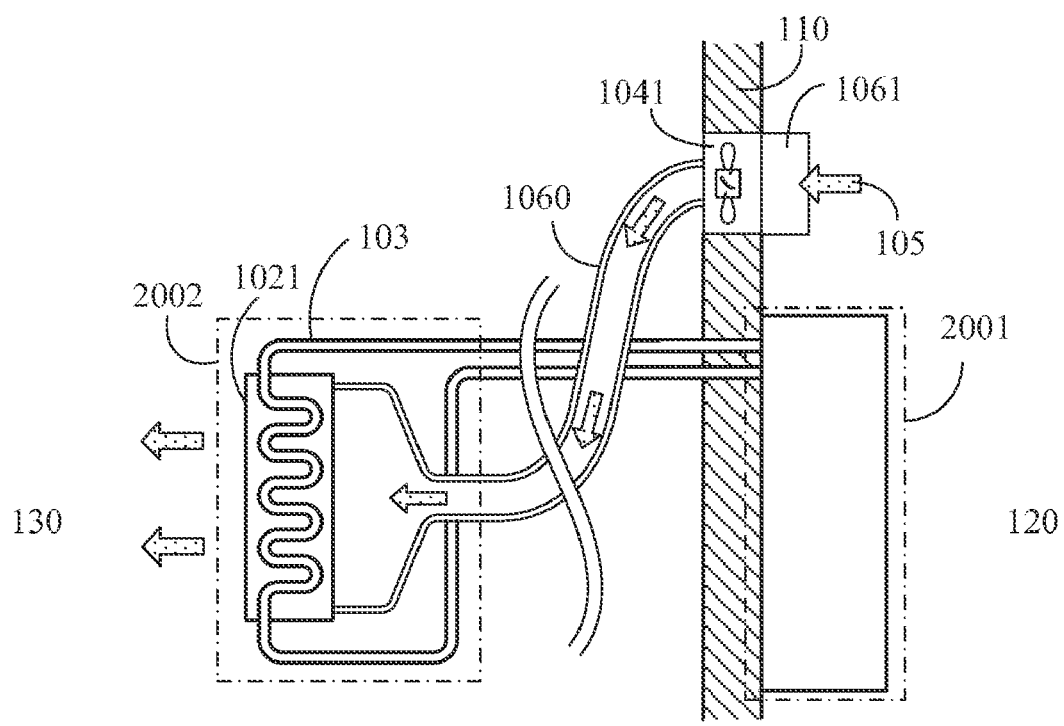
FIG. 10 is a structural schematic view of an embodiment of present invention having the separately mounted blowing pump (1041), the split type air conditioning device main unit (2001) and the split type air conditioning device outdoor unit (2002) without the external heat exchanger airflow exhausting fan unit (104).

FIG. 10 is a structural schematic view of an embodiment of present invention having the separately mounted blowing pump (1041), the split type air conditioning device main unit (2001) and the split type air conditioning device outdoor unit (2002) without the external heat exchanger airflow exhausting fan unit (104).

As illustrated in FIG. 10, the main configurations are as follows:

a split type air conditioning device main unit (2001), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a separately mounted fluid exhausting path (1060), an exhaust amount regulating device (1061) and a blowing pump (1041), for pumping the airflow of the air conditioning object space (120) to the external heat exchanger (1021);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the air conditioning object space exhausted fluid (105) by means of the external heat exchanger (1021);

the coolant fluid pipeline (103), which is a circulation pipeline device for coupling split type air conditioning device main unit (2001) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation which is pumped from the air conditioning object space (120) through the exhaust amount regulating device (1061) and the separately mounted fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

In the air conditioning device utilizing temperature differentiation of exhausted gas to even temperature of external heat exchanger of the present invention, the external temperature differentiation space (130) is an external space insulated from the air conditioning object space (120) by the thermal insulation device (110).

Figure 11:
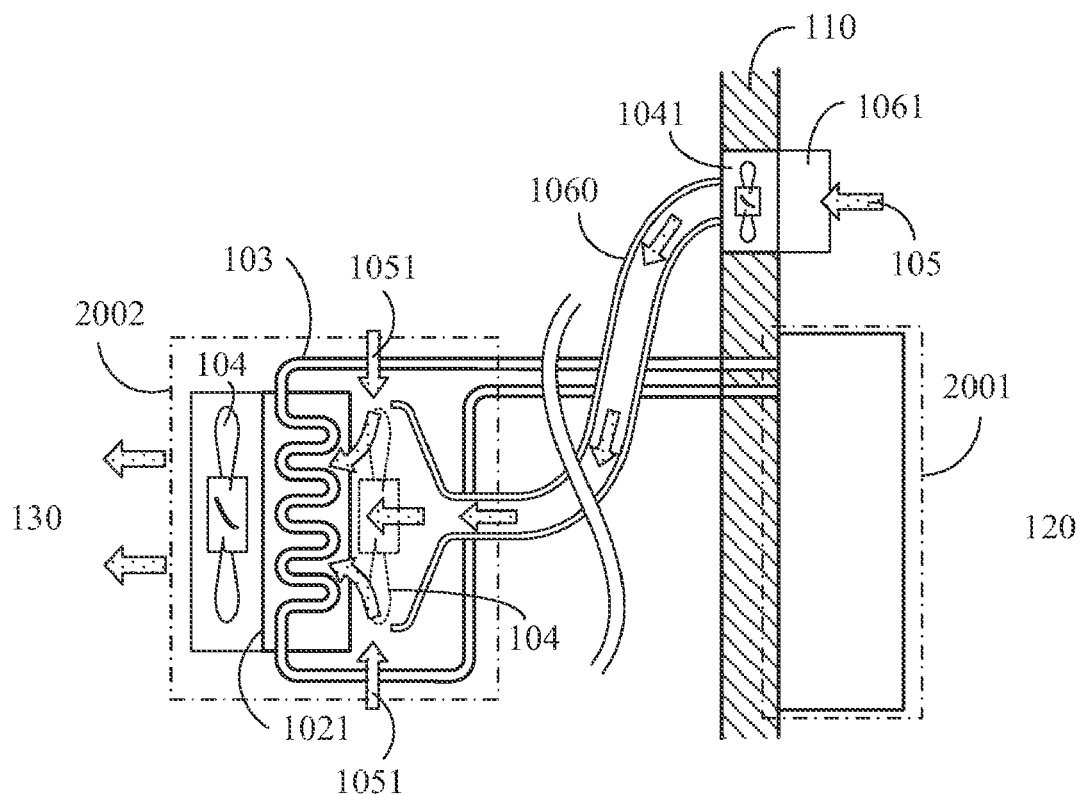
FIG. 11 is a structural schematic view of an embodiment of present invention having the split type air conditioning device main unit (2001), the split type air conditioning device outdoor unit (2002) with the external heat exchanger airflow exhausting fan unit (104) and the separately mounted blowing pump (1041).

FIG. 11 is a structural schematic view of an embodiment of present invention having the split type air conditioning device main unit (2001), the split type air conditioning device outdoor unit (2002) with the external heat exchanger airflow exhausting fan unit (104) and the separately mounted blowing pump (1041).

As illustrated in FIG. 11, the main configurations are as follows:

a split type air conditioning device main unit (2001), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a separately mounted fluid exhausting path (1060), the exhaust amount regulating device (1061) and the blowing pump (1041), for pumping the airflow of the air conditioning object space (120) to the external heat exchanger (1021);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the separately mounted fluid exhausting path (1060), enabling two airflows to exhaust to the external temperature differentiation space (130) through the external heat exchanger (1021);

the coolant fluid pipeline (103), which is a circulation pipeline device for coupling the split type air conditioning device main unit (2001) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

In the air conditioning device utilizing temperature differentiation of exhausted gas to even temperature of external heat exchanger of the present invention, the external temperature differentiation space (130) is an external space insulated from the air conditioning object space (120) by the thermal insulation device (110);

In the air conditioning device utilizing temperature differentiation of exhausted gas to even temperature of external heat exchanger of the present invention, the external airflow (1051) is an airflow surrounding the external temperature differentiation space (130).

Figure 12:
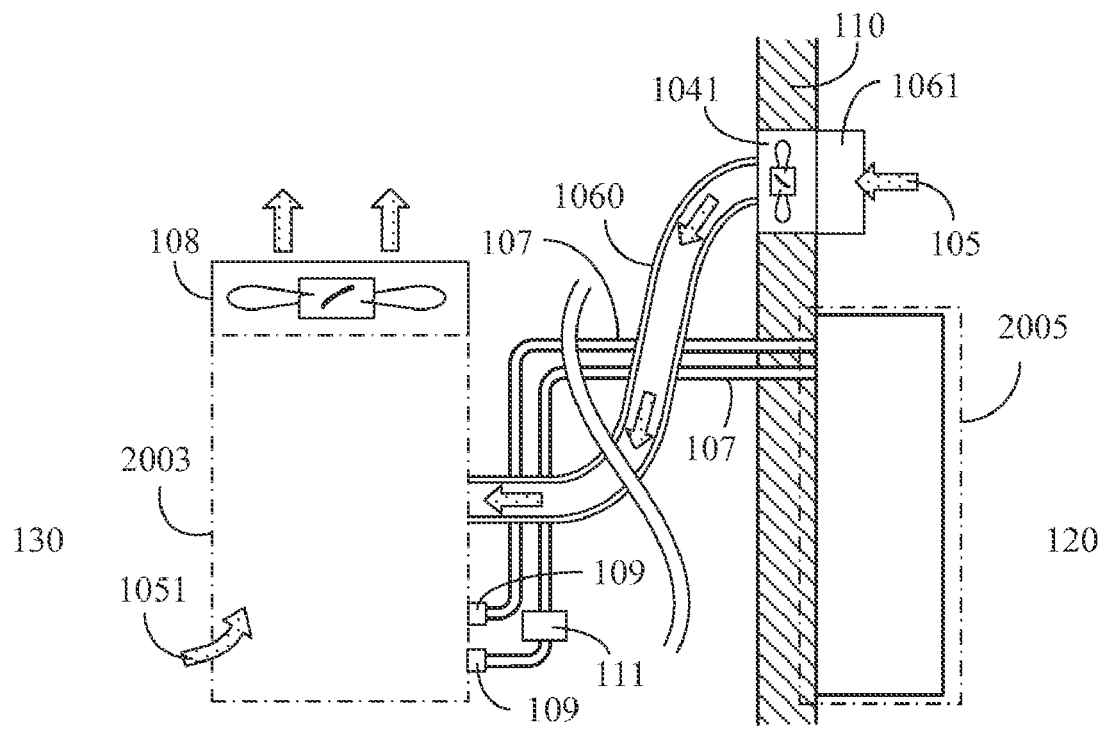
FIG. 12 is a structural schematic view of an embodiment of present invention having a water-cooled air conditioning device main unit (2005), a powered fan provided cooling tower (2003) and the separately mounted blowing pump (1041).

FIG. 12 is a structural schematic view of an embodiment of present invention having a water-cooled air conditioning device main unit (2005), a powered fan provided cooling tower (2003) and the separately mounted blowing pump (1041).

As illustrated in FIG. 12, the main configurations are as follows:

a water-cooled air conditioning device main unit (2005), which is an air conditioning device main unit essentially consisted of a throttle device, a evaporation device, a compression device, pipelines, a control device, an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of the powered fan provided cooling tower (2003) disposed in the external temperature differentiation space (130) so as to form a path of water circulation; and which pumps the airflow in the air conditioning object space (120) through the separately mounted fluid exhausting path (1060) to an air inlet of the powered fan provided cooling tower (2003) by means of the blowing pump (1041);

the powered fan provided cooling tower (2003), comprising a cooling tower equipped with the cooling tower fan unit (108), for example, a counterflow mechanical draft cooling tower, an induced counterflow mechanical draft cooling tower, a counterflow cooling tower, a crossflow mechanical draft cooling tower, or an evaporative cooling tower, and the powered fan provided cooling tower (2003) having an air inlet, so that the air conditioning object space exhausted fluid (105) pumped from the air conditioning object space (120) through the blowing pump (1041) is directed through the separately mounted fluid exhausting path (1060) into the air inlet of the powered fan provided cooling tower (2003), and passing through the powered fan provided cooling tower (2003) so as to cool the waterflow and then is exhausted to the surrounding through the cooling tower fan unit (108), and having a water in and out pipe (109) for connecting the water pipe (107) so as to allow the cooling water to circulate between the powered fan provided cooling tower (2003) and the water-cooled air conditioning device main unit (2005);

the water pipe (107), disposed between a water-cooled condensing device of the water-cooled air conditioning device main unit (2005) and the water in and out pipe (109) of the powered fan provided cooling tower (2003);

the cooling tower fan unit (108), comprising an air blowing or exhausting fan unit or an air pump driven by an electric motor, and having one or more following operation functions, including: 1) pumping the external airflow (1051) of the external temperature differentiation space (130) to the external temperature differentiation space (130) through the inside of the powered fan provided cooling tower (2003); 2) pumping the air conditioning object space exhausted fluid (105) with a temperature differentiation from the air conditioning object space (120) through the exhaust amount regulating device (1061), the blowing pump (1041) and the separately mounted fluid exhausting path (1060) to the external temperature differentiation space (130) through the powered fan provided cooling tower (2003); 3) enabling the external airflow (1051) and the air conditioning object space exhausted fluid (105) to exhaust commonly to the external temperature differentiation space (130) through the powered fan provided cooling tower (2003);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the powered fan provided cooling tower (2003);

In the air conditioning device utilizing temperature differentiation of exhausted gas to even temperature of external heat exchanger, the external temperature differentiation space (130) is an external space insulated from the air conditioning object space (120) by the thermal insulation device (110); In the air conditioning device utilizing temperature differentiation of exhausted gas to even temperature of external heat exchanger of the present invention, the external airflow (1051) is an airflow surrounding the external temperature differentiation space (130).

Figure 13:
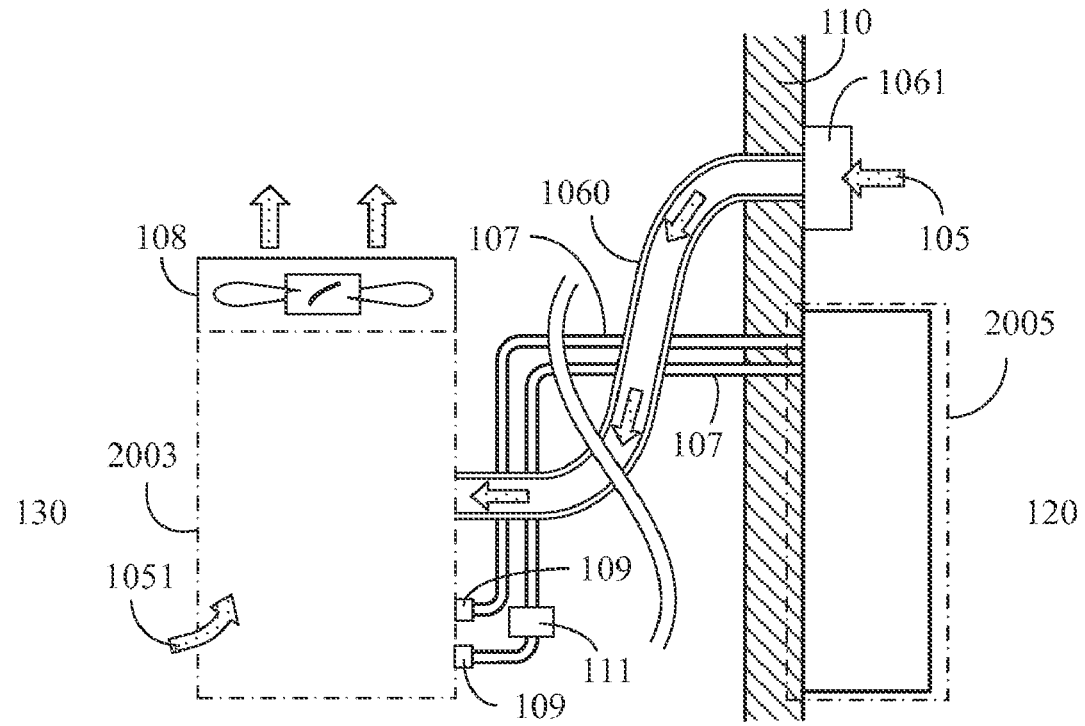
FIG. 13 is a structural schematic view of an embodiment of present invention having a water-cooled air conditioning device main unit (2005) and a powered fan provided cooling tower (2003).

FIG. 13 is a structural schematic view of an embodiment of present invention having a water-cooled air conditioning device main unit (2005) and a powered fan provided cooling tower (2003).

As illustrated in FIG. 13, the main configurations are as follows:

a water-cooled air conditioning device main unit (2005), which is an air conditioning device main unit essentially consisted of a throttle device, a evaporation device, a compression device, pipelines, a control device, an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of the powered fan provided cooling tower (2003) disposed in the external temperature differentiation space (130) so as to form a path of water circulation; and having a separately mounted fluid exhausting path (1060) for delivering the airflow of the air conditioning object space (120) to an air inlet of the powered fan provided cooling tower (2003);

the powered fan provided cooling tower (2003), comprising a cooling tower equipped with the cooling tower fan unit (108), for example, a counterflow mechanical draft cooling tower, an induced counterflow mechanical draft cooling tower, a counterflow cooling tower, a crossflow mechanical draft cooling tower, or an evaporative cooling tower, and the powered fan provided cooling tower (2003) having an air inlet, so that the air conditioning object space exhausted fluid (105) pumped from the air conditioning object space (120) is directed through the separately mounted fluid exhausting path (1060) into the air inlet of the powered fan provided cooling tower (2003), and is passing through the powered fan provided cooling tower (2003) so as to cool the waterflow, and then is exhausted to the surrounding through the cooling tower fan unit (108), and having a water in and out pipe (109) for connecting the water pipe (107) so as to allow the cooling water to circulate between the powered fan provided cooling tower (2003) and the water-cooled air conditioning device main unit (2005);

the water pipe (107), disposed between a water-cooled condensing device of the water-cooled air conditioning device main unit (2005) and the water in and out pipe (109) of the powered fan provided cooling tower (2003);

the cooling tower fan unit (108), comprising an air blowing or exhausting fan unit or an air pump driven by an electric motor, and having one or more following operation functions, including: 1) pumping the external airflow (1051) of the external temperature differentiation space (130) to the external temperature differentiation space (130) through the inside of the powered fan provided cooling tower (2003); 2) pumping the air conditioning object space exhausted fluid (105) with a temperature differentiation from the air conditioning object space (120) through the exhaust amount regulating device (1061) and the separately mounted fluid exhausting path (1060) to the external temperature differentiation space (130) through the powered fan provided cooling tower (2003); 3) enabling the external airflow (1051) and the air conditioning object space exhausted fluid (105) to exhaust commonly to the external temperature differentiation space (130) through the powered fan provided cooling tower (2003);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger insulates of the present invention the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the powered fan provided cooling tower (2003);

In the air conditioning device utilizing temperature differentiation of exhausted gas to even temperature of external heat exchanger, the external temperature differentiation space (130) is an external space insulated from the air conditioning object space (120) by the thermal insulation device (110);

In the air conditioning device utilizing temperature differentiation of exhausted gas to even temperature of external heat exchanger of the present invention, the external airflow (1051) is an airflow surrounding the external temperature differentiation space (130).

Figure 14:
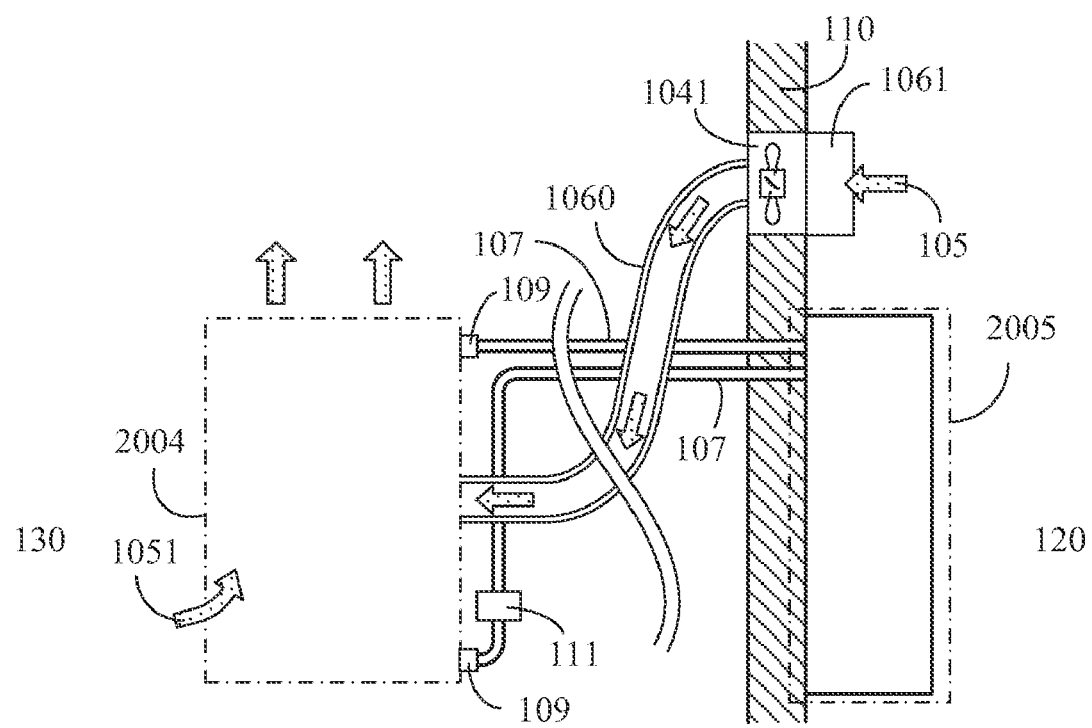
FIG. 14 is a structural schematic view of an embodiment of present invention having a water-cooled air conditioning device main unit (2005), a natural draft cooling tower (2003) and the separately mounted blowing pump (1041).

FIG. 14 is a structural schematic view of an embodiment of present invention having a water-cooled air conditioning device main unit (2005), a natural draft cooling tower (2003) and the separately mounted blowing pump (1041).

As illustrated in FIG. 14, the main configurations are as follows:

a water-cooled air conditioning device main unit (2005), which is an air conditioning device main unit essentially consisted of a throttle device, a evaporation device, a compression device, pipelines, a control device, an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of a natural draft cooling tower (2004) disposed in the external temperature differentiation space (130) so as to form a path of water circulation; and which is pumped the airflow of the air conditioning object space (120) to an air inlet of the natural draft cooling tower (2004) through the separately mounted fluid exhausting path (1060) by means of the blowing pump (1041);

a natural draft cooling tower (2004), comprising a natural draft cooling tower, for example, a crossflow natural draft cooling tower, and the natural draft cooling tower (2004) having an air inlet, and having one or more following operating functions, including: 1) directing the external airflow (1051) from the external temperature differentiation space (130) into the air inlet of the natural draft cooling tower (2004), and passing through the natural draft cooling tower (2004) so as to cool the waterflow, and then exhausting the same to the surrounding through the cooling tower; 2) directing the air conditioning object space exhausted fluid (105) pumped from the air conditioning object space (120) by means of the blowing pump (1041) through the separately mounted fluid exhausting path (1060) into the air inlet of the natural draft cooling tower (2004), and passing through the natural draft cooling tower (2004) so as to cool the waterflow, and then exhausting the same to the surrounding through the cooling tower; 3) directing the air conditioning object space exhausted fluid (105) and the external airflow (1051) into the air inlet of the natural draft cooling tower (2004), and passing through the natural draft cooling tower (2004) so as to cool the waterflow, and then exhausting the same to the surrounding through the cooling tower; and having a water in and out pipe (109) for coupling the water pipe (107) so as to allow the cooling water to circulate between the natural draft cooling tower (2004) and the water-cooled air conditioning device main unit (2005);

the water pipe (107), disposed between a water-cooled condensing device of the water-cooled air conditioning device main unit (2005) and the water in and out pipe (109) of the natural draft cooling tower (2004);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

The air conditioning device utilizing temperature differentiation of exhausted gas to even temperature of external heat exchanger of the present invention insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the natural draft cooling tower (2004);

In the air conditioning device utilizing temperature differentiation of exhausted gas to even temperature of external heat exchanger, the external temperature differentiation space (130) is an external space insulated from the air conditioning object space (120) by the thermal insulation device (110);

In the air conditioning device utilizing temperature differentiation of exhausted gas to even temperature of external heat exchanger, the external airflow (1051) is an airflow surrounding the external temperature differentiation space (130).

Figure 15:
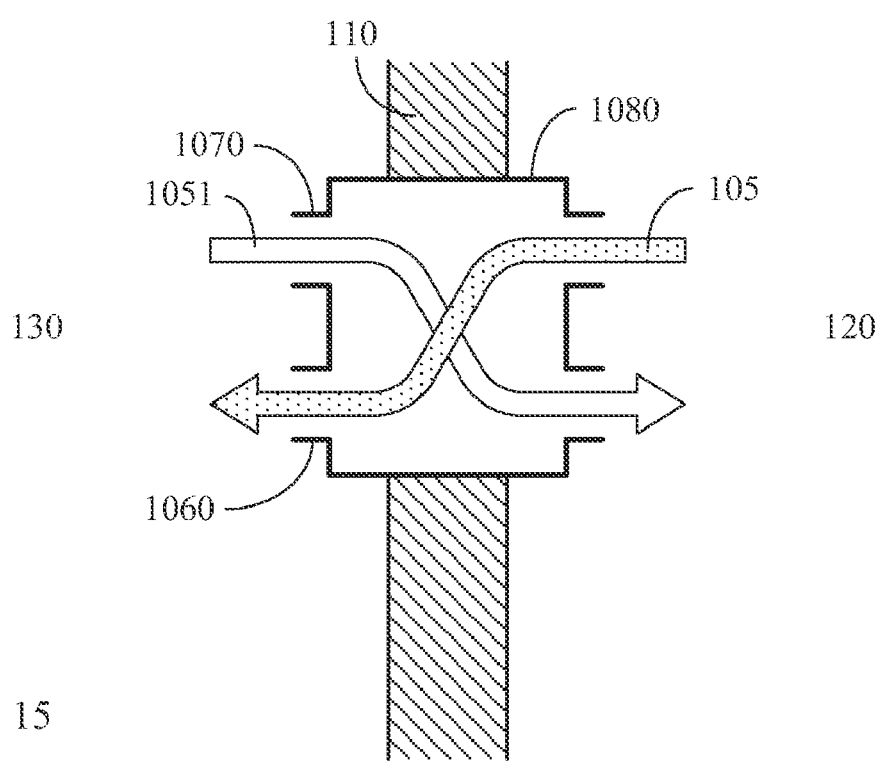
FIG. 15 is a structural schematic view of an embodiment of present invention in which the blowing pump (1041) is replaced by an air intake and exhaust heat exchanger (1080).

In the air conditioning device utilizing temperature differentiation of exhausted gas to even temperature of external heat exchanger of the present invention, the blowing pump (1041) can also be replaced by the air intake and exhaust heat exchanger (1080), wherein the air intake and exhaust heat exchanger (1080) not only directs the airflow of the external temperature differentiation space (130) into the air conditioning object space (120), but also directs the air conditioning object space exhausted fluid (105) through the separately mounted fluid exhausting path (1060) and through the split type air conditioning device outdoor unit (2002) or the powered fan provided cooling tower (2003) to exhaust to the external temperature differentiation space (130);

FIG. 15 is a structural schematic view of an embodiment of present invention in which the blowing pump (1041) is replaced by an air intake and exhaust heat exchanger (1080).

As illustrated in FIG. 15, the main configuration is as follows:

an air intake and exhaust heat exchanger (1080), having a two-circuit bi-directional airflow pumping device which pumps an airflow from the external temperature differentiation space (130) to the air conditioning object space (120) and pumps an airflow from the air conditioning object space (120) to the separately mounted fluid exhausting path (1060), and further including a two-circuit bi-directional heat exchanging device having a heat exchanging function, wherein the air intake and exhaust heat exchanger (1080) not only directs the airflow of the external temperature differentiation space (130) into the air conditioning object space (120), but also directs the air conditioning object space exhausted fluid (105) through the separately mounted fluid exhausting path (1060) and through the split type air conditioning device outdoor unit (2002) or the powered fan provided cooling tower (2003) to exhaust to the external temperature differentiation space (130);

the air conditioning device utilizing temperature differentiation of exhausted gas to even temperature of external heat exchanger of the present invention insulated the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

In the air conditioning device utilizing temperature differentiation of exhausted gas to even temperature of external heat exchanger of the present invention, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

In the air conditioning device utilizing temperature differentiation of exhausted gas to even temperature of external heat exchanger, the external temperature differentiation space (130) is an external space insulated from the air conditioning object space (120) by the thermal insulation device (110);

In the air conditioning device utilizing temperature differentiation of exhausted gas to even temperature of external heat exchanger, the external airflow (1051) is an airflow surrounding the external temperature differentiation space (130).

In the air conditioning device utilizing temperature differentiation of exhausted gas to even temperature of external heat exchanger, the exhausted airflow to the external has an exhausted airflow temperature higher than that of an heat exchanger to the external disposed externally of an temperature regulator;

In the air conditioning device utilizing temperature differentiation of exhausted gas to even temperature of external heat exchanger, the exhausted airflow to the external has an exhausted airflow temperature lower than that of an heat exchanger to the external disposed externally of an temperature regulator;

In the air conditioning device utilizing temperature differentiation of exhausted gas to even temperature of external heat exchanger, the external heat exchanger (1021) is integrally formed with the main unit and the fluid exhausting path;

In the air conditioning device utilizing temperature differentiation of exhausted gas to even temperature of external heat exchanger, the external heat exchanger (1021) is separated from the main unit and the both are connected by means of a fluid exhaust path;

In the air conditioning device utilizing temperature differentiation of exhausted gas to even temperature of external heat exchanger, the exhausted fluid is served to heat exchange with the pipeline of the heat exchanger to the external disposed in the external or a surface of a heat dissipating device;

The air conditioning device utilizing temperature differentiation of exhausted gas to even temperature of external heat exchanger includes a gas cooling/heating air conditioning device applied to the a room in a building, a tent, a car, a boat, a vehicle.

The invention claimed is:

1. A cooling/heating air conditioning device for regulating temperature, which pumps an airflow exhausted from a space in an air conditioning object such as inside of a room or vehicle to the external through an external heat exchanger disposed at the external of the air conditioning object such as outside of the room or vehicle so as to equalize the temperature of the fluid flowing through the internal of the external heat exchanger by means of the temperature differentiation between the two fluids; when the air conditioning device is operated as a cooler, the airflow of a relatively lower temperature exhausted from the space of the air conditioning object such as the inside of the room can be used to facilitate the decreasing of the temperature of the external heat exchanger which is disposed outdoors as a condenser, and when the air conditioning device is operated as a heater, the exhausted airflow of a relatively higher temperature can be used to facilitate the increasing of the temperature of the external heat exchanger which is disposed outdoors as an evaporator; wherein:

an external heat exchanger (1021) having a coolant fluid pipe (103) is operated, the function of which is to allow a high pressure gas coolant at the inlet "a" of the external heat exchanger (1021) to convert into a liquid by releasing heat to the external heat exchanger (1021) and flow out from the outlet "b" of the external heat exchanger (1021), at this time, if the temperature of an external temperature differentiation space (130) where the external heat exchanger (1021) is located is too high, it is difficult to release heat from the coolant in the coolant fluid pipe (103), thereby by utilizing an airflow exhausted externally from an indoor air conditioning object space (120) at a relatively lower temperature being blown through the external heat exchanger (1021), the temperature of the external heat exchanger (1021) is reduced to facilitate the enhancing of the cooling air conditioning efficiency; on the contrary, if an air heater is applied, by make use of an airflow exhausted externally at a relatively higher temperature being flowed through the external heat exchanger (1021), the temperature of the external heat exchanger (1021) is raised to facilitate the enhancing of the heating air conditioning efficiency;

the air conditioning device utilizing temperature differentiation of exhausted gas to even temperature of external heat exchanger is formed by applying the aforementioned operating principles to various types of air conditioning devices including integral air conditioning devices, split type air conditioning devices, cooling tower type air conditioning device.

2. The air conditioning device utilizing temperature differentiation of exhausted gas to even temperature of external heat exchanger as claimed in claim 1, including an integral air conditioning device with an external heat exchanger airflow exhausting fan unit (104) and a fluid exhausting path (106) so as to pump an air conditioning object space exhausted fluid (105) and an external airflow (1051) to flow together through an external heat exchanger (1021), which consists essentially of:

- an air conditioning device main unit (101), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having an exhaust amount regulating device (1061), and a fluid exhausting path (106) formed by a housing for allowing the airflow of the air conditioning object space (120) to flow to the external heat exchanger (1021);
- the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);
- the coolant fluid pipeline (103), which is a circulation pipeline device for coupling the air conditioning device main unit (101) and the external heat exchanger (1021), in which a gas or liquid coolant is circulated;
- an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the fluid exhausting path (106), enabling two airflows to exhaust to the external temperature differentiation space (130) through the external heat exchanger (1021);
- the exhaust amount regulating device (1061), formed by a fluid gate, a shutoff gate or valve for operating and adjusting the exhaust amount of the air conditioning object space exhausted fluid (105);
- the fluid exhausting path (106), which is a fluid passage structure for permitting the exhaust of the air conditioning object space exhausted fluid (105);
- whereby an integral air conditioning device assembly (1000) is formed by the abovementioned structures;
- the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;
- in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021);
- in the air conditioning device utilizing temperature differentiation of exhausted gas to even temperature of external heat exchanger, the external temperature differentiation space (130) is an external space insulated from the air conditioning object space (120) by the thermal insulation device (110);
- in the air conditioning device utilizing temperature differentiation of exhausted gas to even temperature of external heat exchanger, the external airflow (1051) is an airflow surrounding the external temperature differentiation space (130).

3. The air conditioning device utilizing temperature differentiation of exhausted gas to even temperature of external heat exchanger as claimed in claim 1, including an integral air conditioning device without a heat exchanger airflow exhausting fan unit (104) and a ventilating device (1041) commonly constructed with a fluid exhausting path (106) so as to pump an air conditioning object space exhausted fluid (105) to flow through an external heat exchanger (1021), which consists essentially of:

- an air conditioning device main unit (101), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (106) formed by a housing, and having an exhaust amount regulating device (1061), the coolant fluid pipeline (103) for allowing the airflow of the air conditioning object space (120) to flow to the external heat exchanger (1021);
- the external heat exchanger (1021), provided with the coolant fluid pipeline (103) for allowing the coolant passed from the main unit to heat exchange with the air conditioning object space exhausted fluid (105) through the external heat exchanger (1021);

the coolant fluid pipeline (103), which is a circulation pipeline device for coupling the air conditioning device main unit (101) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the fluid exhausting path (106), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (106), which is a fluid passage structure for permitting the exhaust of the air conditioning object space exhausted fluid (105);

whereby an integral air conditioning device assembly (1000) is formed by the abovementioned structures;

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021);

in the air conditioning device utilizing temperature differentiation of exhausted gas to even temperature of external heat exchanger, the external temperature differentiation space (130) is an external space insulated from the air conditioning object space (120) by the thermal insulation device (110).

4. The air conditioning device utilizing temperature differentiation of exhausted gas to even temperature of external heat exchanger as claimed in claim 1, wherein it includes having a separately mounted fluid exhausting path (1060) and an external heat exchanger airflow exhausting fan unit (104) so as to pump an air conditioning object space exhausted fluid (105) and an external airflow (1051) to flow together through an external heat exchanger (1021), which consists essentially of:

an air conditioning device main unit (101), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a separately mounted fluid exhausting path (1060) and an exhaust amount regulating device (1061), for serving as a path for the airflow of the air conditioning object space (120) flowing to the external heat exchanger (1021);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the separately mounted fluid exhausting path (1060), enabling two airflows to exhaust commonly to the external temperature differentiation space (130) through the external heat exchanger (1021);

whereby an integral air conditioning device assembly (1000) is formed by the abovementioned structures;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021);

in the air conditioning device utilizing temperature differentiation of exhausted gas to even temperature of external heat exchanger, the external temperature differentiation space (130) is an external space insulated from the air conditioning object space (120) by the thermal insulation device (110);

in the air conditioning device utilizing temperature differentiation of exhausted gas to even temperature of external heat exchanger, the external airflow (1051) is an airflow surrounding the external temperature differentiation space (130).

5. The air conditioning device utilizing temperature differentiation of exhausted gas to even temperature of external heat exchanger as claimed in claim 1, wherein it includes having a separately mounted blowing pump (1041) and an exhaust amount regulating device (1061) and having an air conditioning device assembly (1000) without the external heat exchanger airflow exhausting fan unit (104), which consists essentially of:

an air conditioning device main unit (101), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a separately mounted fluid exhausting path (1060), an exhaust amount regulating device (1061), a blowing pump (1041), for allowing the airflow of the air conditioning object space (120) to flow to the external heat exchanger (1021);

the external heat exchanger (1021), provided with the coolant fluid pipeline (103) for allowing the coolant passed from the main unit to heat exchange with the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

whereby an integral air conditioning device assembly (1000) is formed by the abovementioned structures;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the separately mounted fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021);

in the air conditioning device utilizing temperature differentiation of exhausted gas to even temperature of external heat exchanger, the external temperature differentiation space (130) is an external space insulated from the air conditioning object space (120) by the thermal insulation device (110).

6. The air conditioning device utilizing temperature differentiation of exhausted gas to even temperature of external heat exchanger as claimed in claim 1, wherein it includes having an air conditioning device assembly (1000) mounted with an external heat exchanger airflow exhausting fan unit (104) and the separately mounted fluid exhausting path (1060) and the blowing pump (1041), which consists essentially of:

an air conditioning device main unit (101), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a separately mounted fluid exhausting path (1060) and a blowing pump (1041), for pumping the airflow of the air conditioning object space (120) to the external heat exchanger (1021);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the separately mounted fluid exhausting path (1060) by the blowing pump (1041), enabling two airflows to exhaust commonly to the external temperature differentiation space (130) through the external heat exchanger (1021);

whereby an integral air conditioning device assembly (1000) is formed by the abovementioned structures;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the separately mounted fluid exhausting path (1060), so as to exhaust to the external temperature differentiation space (130) through the external heat exchanger (1021), enabling two airflows to exhaust commonly to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021);

in the air conditioning device utilizing temperature differentiation of exhausted gas to even temperature of external heat exchanger, the external temperature differentiation space (130) is an external space insulated from the air conditioning object space (120) by the thermal insulation device (110);

in the air conditioning device utilizing temperature differentiation of exhausted gas to even temperature of external heat exchanger, the external airflow (1051) is an airflow surrounding the external temperature differentiation space (130).

7. The air conditioning device utilizing temperature differentiation of exhausted gas to even temperature of external heat exchanger as claimed in claim 1, wherein it includes having a split type air conditioning device outdoor unit (2002) with an external heat exchanger airflow exhausting fan unit (104) and a split type air conditioning device main unit (2001) mounted with the separately mounted fluid exhausting path (1060), which consists essentially of:

a split type air conditioning device main unit (2001), essentially consisted of a throttle device, a evaporation device, a compression device, pipelines, a control device, an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a separately mounted fluid exhausting path (1060) and an exhaust amount regulating device (1061) for serving as a path for the airflow of the air conditioning object space (120) flowing to the external heat exchanger (1021);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the separately mounted fluid exhausting path (1060), and enabling two airflows to exhaust commonly to the external temperature differentiation space (130) through the external heat exchanger (1021);

the coolant fluid pipeline (103), which is a circulation pipeline device for coupling the air conditioning device main unit (101) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

in the air conditioning device utilizing temperature differentiation of exhausted gas to even temperature of external heat exchanger, the external temperature differentiation space (130) is an external space insulated from the air conditioning object space (120) by the thermal insulation device (110);

in the air conditioning device utilizing temperature differentiation of exhausted gas to even temperature of external heat exchanger, the external airflow (1051) is an airflow surrounding the external temperature differentiation space (130).

8. The air conditioning device utilizing temperature differentiation of exhausted gas to even temperature of external heat exchanger as claimed in claim 1, wherein it includes having a split type air conditioning device main unit (2001) commonly constructed with the blowing pump (1041) and having a split type air conditioning device outdoor unit (2002) without the external heat exchanger airflow exhausting fan unit (104), which consists essentially of:

a split type air conditioning device main unit (2001), essentially consisted of a throttle device, a evaporation device, a compression device, pipelines, a control device, an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a separately mounted fluid exhausting path (1060), an exhaust amount regulating device (1061) and a blowing pump (1041), for pumping the airflow of the air conditioning object space (120) to the external heat exchanger (1021);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the air conditioning object space exhausted fluid (105) by means of the external heat exchanger (1021);

the coolant fluid pipeline (103), which is a circulation pipeline device for coupling the air conditioning device main unit (101) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation which is pumped from the air conditioning object space (120) through the exhaust amount regulating device (1061) and the separately mounted fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

in the air conditioning device utilizing temperature differentiation of exhausted gas to even temperature of external heat exchanger, the external temperature differentiation space (130) is an external space insulated from the air conditioning object space (120) by the thermal insulation device (110).

9. The air conditioning device utilizing temperature differentiation of exhausted gas to even temperature of external heat exchanger as claimed in claim 1, wherein it includes having a separately mounted fluid exhausting path (1060), a split type air conditioning device main unit (2001) and a split type air conditioning device outdoor unit (2002) with an external heat exchanger airflow exhausting fan unit (104), which consists essentially of:

a split type air conditioning device main unit (2001), essentially consisted of a throttle device, a evaporation device, a compression device, pipelines, a control device, an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a separately mounted fluid exhausting path (1060) for serving as a path for the airflow of the air conditioning object space (120) flowing to the external heat exchanger (1021);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the separately mounted fluid exhausting path (1060), enabling two airflows to exhaust to the external temperature differentiation space (130) through the external heat exchanger (1021);

the coolant fluid pipeline (103), which is a circulation pipeline device for coupling the split type air conditioning device main unit (2001) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

in the air conditioning device utilizing temperature differentiation of exhausted gas to even temperature of external heat exchanger, the external temperature differentiation space (130) is an external space insulated from the air conditioning object space (120) by the thermal insulation device (110);

in the air conditioning device utilizing temperature differentiation of exhausted gas to even temperature of external heat exchanger, the external airflow (1051) is an airflow surrounding the external temperature differentiation space (130).

10. The air conditioning device utilizing temperature differentiation of exhausted gas to even temperature of external heat exchanger as claimed in claim 1, wherein it includes having a separately mounted blowing pump (1041), a split type air conditioning device main unit (2001) and a split type air conditioning device outdoor unit (2002) without the external heat exchanger airflow exhausting fan unit (104) mounted thereto, which consists essentially of:

a split type air conditioning device main unit (2001), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a separately mounted fluid exhausting path (1060), an exhaust amount regulating device (1061) and a blowing pump (1041), for pumping the airflow of the air conditioning object space (120) to the external heat exchanger (1021);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the air conditioning object space exhausted fluid (105) by means of the external heat exchanger (1021);

the coolant fluid pipeline (103), which is a circulation pipeline device for coupling split type air conditioning device main unit (2001) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation which is pumped from the air conditioning object space (120) through the exhaust amount regulating device (1061) and the separately mounted fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

in the air conditioning device utilizing temperature differentiation of exhausted gas to even temperature of external heat exchanger, the external temperature differentiation space (130) is an external space insulated from the air conditioning object space (120) by the thermal insulation device (110).

11. The air conditioning device utilizing temperature differentiation of exhausted gas to even temperature of external heat exchanger as claimed in claim 1, wherein it includes having the split type air conditioning device main unit (2001), the split type air conditioning device outdoor unit (2002) with the external heat exchanger airflow exhausting fan unit (104) and the separately mounted blowing pump (1041), which consists essentially of:

a split type air conditioning device main unit (2001), essentially consisted of a throttle device, a evaporation device, a compression device, pipelines, a control device, an air conditioning airflow blower and a housing, and coupled to a pipeline of the external heat exchanger (1021) mounted in an external temperature differentiation space (130) to form a circulating path by means of a coolant fluid pipeline (103); and having a separately mounted fluid exhausting path (1060), the exhaust amount regulating device (1061) and the blowing pump (1041), for pumping the airflow of the air conditioning object space (120) to the external heat exchanger (1021);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the separately mounted fluid exhausting path (1060), enabling two airflows to exhaust commonly to the external temperature differentiation space (130) through the external heat exchanger (1021);

the coolant fluid pipeline (103), which is a circulation pipeline device for coupling the split type air conditioning device main unit (2001) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the external heat exchanger (1021) of the split type air conditioning device outdoor unit (2002);

in the air conditioning device utilizing temperature differentiation of exhausted gas to even temperature of external heat exchanger, the external temperature differentiation space (130) is an external space insulated from the air conditioning object space (120) by the thermal insulation device (110);

in the air conditioning device utilizing temperature differentiation of exhausted gas to even temperature of external heat exchanger, the external airflow (1051) is an airflow surrounding the external temperature differentiation space (130).

12. The air conditioning device utilizing temperature differentiation of exhausted gas to even temperature of external heat exchanger as claimed in claim 1, wherein it includes having a water-cooled air conditioning device main unit (2005), a powered fan provided cooling tower (2003) and the separately mounted blowing pump (1041), which consists essentially of:

a water-cooled air conditioning device main unit (2005), which is an air conditioning device main unit essentially consisted of a throttle device, a evaporation device, a compression device, pipelines, a control device, an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of the powered fan provided cooling tower (2003) disposed in the external temperature differentiation space (130) so as to form a path of water circulation; and which pumps the airflow in the air conditioning object space (120) through the separately mounted fluid exhausting path (1060) to an air inlet of the powered fan provided cooling tower (2003) by means of the blowing pump (1041);

the powered fan provided cooling tower (2003), comprising a cooling tower equipped with the cooling tower fan unit (108), for example, a counterflow mechanical draft cooling tower, an induced counterflow mechanical draft cooling tower, a counterflow cooling tower, a crossflow mechanical draft cooling tower, or an evaporative cooling tower, and the powered fan provided cooling tower (2003) having an air inlet, so that the air conditioning object space exhausted fluid (105) pumped from the air conditioning object space (120) through the blowing pump (1041) is directed through the separately mounted fluid exhausting path (1060) into the air inlet of the powered fan provided cooling tower (2003), and passing through the powered fan provided cooling tower (2003) so as to cool the waterflow through the powered fan provided cooling tower (2003) and then is exhausted to the surrounding through the cooling tower fan unit (108), and having a water in and out pipe (109) for connecting the water pipe (107) so as to allow the cooling water to circulate between the powered fan provided cooling tower (2003) and the water-cooled air conditioning device main unit (2005);

the water pipe (107), disposed between a water-cooled condensing device of the water-cooled air conditioning device main unit (2005) and the water in and out pipe (109) of the powered fan provided cooling tower (2003);

the cooling tower fan unit (108), comprising an air blowing or exhausting fan unit or an air pump driven by an electric motor, and having one or more following operation functions, including: 1) pumping the external airflow (1051) of the external temperature differentiation space (130) to the external temperature differentiation space (130) through the inside of the powered fan provided cooling tower (2003); 2) pumping the air conditioning object space exhausted fluid (105) with a temperature differentiation from the air conditioning object space (120) through the exhaust amount regulating device (1061), the blowing pump (1041) and the separately mounted fluid exhausting path (1060), to the external temperature differentiation space (130) through the powered fan provided cooling tower (2003); 3) enabling the external airflow (1051) and the air conditioning object space exhausted fluid (105) to exhaust commonly to the external temperature differentiation space (130) through the powered fan provided cooling tower (2003);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the powered fan provided cooling tower (2003);

in the air conditioning device utilizing temperature differentiation of exhausted gas to even temperature of external heat exchanger, the external temperature differentiation space (130) is an external space insulated from the air conditioning object space (120) by the thermal insulation device (110);

In the air conditioning device utilizing temperature differentiation of exhausted gas to even temperature of external heat exchanger of the present invention, the external airflow (1051) is an airflow surrounding the external temperature differentiation space (130).

13. The air conditioning device utilizing temperature differentiation of exhausted gas to even temperature of external heat exchanger as claimed in claim 1, wherein it includes having a water-cooled air conditioning device main unit (2005) and a powered fan provided cooling tower (2003), which consists essentially of:

a water-cooled air conditioning device main unit (2005), which is an air conditioning device main unit essentially consisted of a throttle device, a evaporation device, a compression device, pipelines, a control device, an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of the powered fan provided cooling tower (2003) disposed in the external temperature differentiation space (130) so as to form a path of water circulation; and having a separately mounted fluid exhausting path (1060) for delivering the airflow of the air conditioning object space (120) to an air inlet of the powered fan provided cooling tower (2003);

the powered fan provided cooling tower (2003), comprising a cooling tower equipped with the cooling tower fan unit (108), for example, a counterflow mechanical draft cooling tower, an induced counterflow mechanical draft cooling tower, a counterflow cooling tower, a crossflow mechanical draft cooling tower, or an evaporative cooling tower, and the powered fan provided cooling tower (2003) having an air inlet, so that the air conditioning object space exhausted fluid (105) pumped from the air conditioning object space (120) is directed through the separately mounted fluid exhausting path (1060) into the air inlet of the powered fan provided cooling tower (2003), and is passing through the powered fan provided cooling tower (2003) so as to cool the waterflow , and then is exhausted to the surrounding through the cooling tower fan unit (108), and having a water in and out pipe (109) for connecting the water pipe (107) so as to allow the cooling water to circulate between the powered fan provided cooling tower (2003) and the water-cooled air conditioning device main unit (2005);

the water pipe (107), disposed between a water-cooled condensing device of the water-cooled air conditioning device main unit (2005) and the water in and out pipe (109) of the powered fan provided cooling tower (2003);

the cooling tower fan unit (108), comprising an air blowing or exhausting fan unit or an air pump driven by an electric motor, and having one or more following operation functions, including: 1) pumping the external airflow (1051) of the external temperature differentiation space (130) to the external temperature differentiation space (130) through the inside of the powered fan provided cooling tower (2003); 2) pumping the air conditioning object space exhausted fluid (105) with a temperature differentiation from the air conditioning object space (120) through the exhaust amount regulating device (1061) and the separately mounted fluid exhausting path (1060) to the external temperature differentiation space (130) through the powered fan provided cooling tower (2003); 3) enabling the external airflow (1051) and the air conditioning object space exhausted fluid (105) to exhaust commonly to the external temperature differentiation space (130) through the powered fan provided cooling tower (2003);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the powered fan provided cooling tower (2003);

in the air conditioning device utilizing temperature differentiation of exhausted gas to even temperature of external heat exchanger, the external temperature differentiation space (130) is an external space insulated from the air conditioning object space (120) by the thermal insulation device (110);

In the air conditioning device utilizing temperature differentiation of exhausted gas to even temperature of external heat exchanger of the present invention, the external airflow (1051) is an airflow surrounding the external temperature differentiation space (130).

14. The air conditioning device utilizing temperature differentiation of exhausted gas to even temperature of external heat exchanger as claimed in claim 1, wherein it includes having a water-cooled air conditioning device main unit (2005), a natural draft cooling tower (2003) and the separately mounted blowing pump (1041), which consists essentially of:

a water-cooled air conditioning device main unit (2005), which is an air conditioning device main unit essentially consisted of a throttle device, a evaporation device, a compression device, pipelines, a control device, an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of a natural draft cooling tower (2004) disposed in the external temperature differentiation space (130) so as to form a path of water circulation; and which is pumped the airflow of the air conditioning object space (120) to an air inlet of the natural draft cooling tower (2004) through the separately mounted fluid exhausting path (1060) by means of the blowing pump (1041);

a natural draft cooling tower (2004), comprising a natural draft cooling tower, for example, a crossflow natural draft cooling tower, and the natural draft cooling tower (2004) having an air inlet, and having one or more following operating functions, including: 1) directing the external airflow (1051) from the external temperature differentiation space (130) into the air inlet of the natural draft cooling tower (2004), and passing through the natural draft cooling tower (2004) so as to cool the waterflow, and exhausting the same to the surrounding through the cooling tower; 2) directing the air conditioning object space exhausted fluid (105) pumped from the air conditioning object space (120) by means of the blowing pump (1041) through the separately mounted fluid exhausting path (1060) into the air inlet of the natural draft cooling tower (2004), and passing through the natural draft cooling tower (2004) so as to cool the waterflow, and then exhausting the same to the surrounding through the cooling tower; 3) directing the air conditioning object space exhausted fluid (105) and the external airflow (1051) into the air inlet of the natural draft cooling tower (2004), and passing through the natural draft cooling tower (2004) so as to cool the waterflow, and then exhausting the same to the surrounding through the cooling tower; and having a water in and out pipe (109) for coupling the water pipe (107) so as to allow the cooling water to circulate between the natural draft cooling tower (2004) and the water-cooled air conditioning device main unit (2005);

the water pipe (107), disposed between a water-cooled condensing device of the water-cooled air conditioning device main unit (2005) and the water in and out pipe (109) of the natural draft cooling tower (2004);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the separately mounted fluid exhausting path (1060), which is a fluid passage structure for permitting the exhaust of the air conditioning object space exhausted fluid (105);

the air conditioning device utilizing temperature differentiation of exhausted gas to even temperature of external heat exchanger insulates the air conditioning object space (120) from the external temperature differentiation space (130) by means of a thermal insulation device (110) on site, the insulation structure (110) including a wall of a building, a housing of a vehicle, or a housing of a mechanism, etc. which is formed by a material with a thermal insulative property or a better thermal insulative property;

in the air conditioning device utilizing temperature differentiation of exhausted gas to even temperature of external heat exchanger, the air conditioning object space (120) generally refers to a space in a room or a vehicle or a boat, serving as a temperature raising or temperature lowering object of the air conditioning device; the air conditioning object space exhausted fluid (105) is an airflow exhausted externally from the inside of the air conditioning object space (120) and flowing through the natural draft cooling tower (2004);

in the air conditioning device utilizing temperature differentiation of exhausted gas to even temperature of external heat exchanger, the external temperature differentiation space (130) is an external space insulated from the air conditioning object space (120) by the thermal insulation device (110);

In the air conditioning device utilizing temperature differentiation of exhausted gas to even temperature of external heat exchanger, the external airflow (1051) is an airflow surrounding the external temperature differentiation space (130).

15. The air conditioning device utilizing temperature differentiation of exhausted gas to even temperature of external heat exchanger as claimed in claim 1, wherein the blowing pump (1041) is replaced by an air intake and exhaust heat exchanger (1080), wherein the air intake and exhaust exchanger (1080), which not only directs the airflow of the external temperature differentiation space (130) into the air conditioning object space (120), but also directs the air conditioning object space exhausted fluid (105) through the separately mounted fluid exhausting path (1060) and through the split type air conditioning device outdoor unit (2002) or the powered fan provided cooling tower (2003) to exhaust to the external temperature differentiation space (130), and it consists essentially of:

an air intake and exhaust heat exchanger (1080), having a two-circuit bi-directional airflow pumping device which pumps an airflow from the external temperature differentiation space (130) to the air conditioning object space (120) and pumps an airflow from the air conditioning object space (120) to the separately mounted fluid exhausting path (1060), and further including a two-circuit bi-directional heat exchanging device having a heat exchanging function, wherein the air intake and exhaust heat exchanger (1080) not only directs the airflow of the external temperature differentiation space (130) into the air conditioning object space (120), but also directs the air conditioning object space exhausted fluid (105) through the separately mounted fluid exhausting path (1060) and through the split type air conditioning device outdoor unit (2002) or the powered fan provided cooling tower (2003) to exhaust to the external temperature differentiation space (130).

* * * * *